United States Patent [19]

Soulliard

[11] 4,275,271
[45] Jun. 23, 1981

[54] SUB-MINIATURE RADIO TELEPHONE DECODER

[75] Inventor: Charles Soulliard, Tucson, Ariz.

[73] Assignee: Midian Electronics, Inc., Tucson, Ariz.

[21] Appl. No.: 47,588

[22] Filed: Jun. 8, 1979

[51] Int. Cl.³ .............................................. H04Q 7/04
[52] U.S. Cl. .................................. 179/2 EB; 455/34; 340/167 R
[58] Field of Search ................. 179/2 E, 2 EB, 2 EC, 179/2 EA, 84 VF, 2 DP; 455/31–34; 340/167 R

[56] References Cited

U.S. PATENT DOCUMENTS

| | | | |
|---|---|---|---|
| 3,387,270 | 6/1968 | Adlhoch et al. | 340/167 R |
| 3,458,664 | 7/1969 | Adlhoch et al. | 179/2 EB |
| 3,581,019 | 5/1971 | Ryan | 179/2 EB |
| 3,652,805 | 3/1972 | Wisner | 179/84 VF |
| 3,763,324 | 10/1973 | Garcia et al. | 179/2 EB |
| 3,859,475 | 1/1975 | Wulfsberg et al. | 455/34 |
| 3,936,616 | 2/1976 | Di Gianfilippo et al. | 179/2 EB |

Primary Examiner—Gerald L. Brigance
Attorney, Agent, or Firm—Harold Gell

[57] ABSTRACT

Presented herein is a sub-miniature radio telephone decoder which through a unique arrangement of integrated circuits adapted to create frequency detectors and counters provide the means whereby a radio telephone receiver is held in a muted state until a predetermined 600/1500 MTS code representing a phone number is decoded. When the predetermined code has been detected, the decoder unmutes the receiver and activates an audio signal. The functions are accomplished by first and second frequency detectors responsive to 600 Hz and 1500 Hz tones in combination with means to count frequency shifts between the two tones and interpret sets of shifts as digits of a predetermined telephone code.

15 Claims, 5 Drawing Figures

SUB-MINIATURE RADIO TELEPHONE DECODER

TECHNICAL FIELD

This invention relates to sub-miniature radio telephone decoders adapted to fit inside hand-held receiver transmitters and decode a predetermined Bell System 600/1500 transitional signalling format code and unmute the receiver in response thereto.

BACKGROUND OF PRIOR ART

The use of radio telephones in mobile applications as a convenience or business tool is becoming increasingly popular and has created a demand for reliable instruments compatible with conventional land line telephone systems and the dialing codes used therein. This demand has been met by numerous systems adapted to decode dial codes. However, these systems become increasingly complex as the number of digits in the codes increases to meet the increased user demand. This has resulted in the development of radio telephone decoders which are complex, costly, difficult to maintain, difficult to install and tailor to a specific application and require special mounting and installation considerations.

For instance, U.S. Pat. No. 3,859,475 on "Decoder Channel Selector And Enunciator System In An Airborne Radio Telephone System" issued to P. Wulfsberg et al on Jan. 3,1975 teaches the concept of a radio telephone decoder of the type which determines a series code based upon the transition of a tone signal between 600 and 1500 Hz but it is limited in its ability to cope with the ever increasing number of radio telephones and is not compatible with a standard seven digit dial code due to the five digit selector limitation in the circuitry. This system, while an improvement over the bulky relay decoders used in prior art does not appear to provide an adaptable, field strapable decoding system or sub-miniature structure which would simplify installation and maintenance.

OBJECTIVES OF THE INVENTION

In view of the preceding, it is a primary objective of the present invention to provide a sub-miniature radio telephone decoder capable of decoding dial codes of up to eight digits using 600/1500 Hz MTS format.

A further objective of the present invention is to provide a sub-miniature radio telephone decoder which is field strapable to provide easy selection of a telephone number having one to eight digits.

A still further objective of the present invention is to provide a sub-miniature radio telephone detector incorporating Cmos state of the art technology which will permit fabrication of the decoder in a modular package which will fit within existing hand-held receiver transmitters.

A still further objective of the present invention is to provide a sub-miniature radio telephone decoder which is inexpensive to produce, easy to maintain and requires no level adjustments.

The preceding, and other objectives of the present invention will become apparent in light of the specification, drawings and claims which follow.

BRIEF SUMMARY OF THE INVENTION

The sub-miniature radio telephone decoder disclosed herein is designed to be compatible with and fit within all hand-held radio telephone receiver transmitters. It can also be installed in modularly constructed mobile radio telephones without the necessity of adding additional mounting fixtures for by virtue of its relatively small size, the decoder can be attached to any existing module or chassis.

The decoder is comprised of a pair of tone detectors responsive to 600 Hz and 1500 Hz tone signals. The detectors are coupled to a common operational amplifier in a fashion which will cause the operational amplifier output to change state as a function of tone shifts between the 600 Hz and 1500 Hz detectors. This creates a pulsed code representing the dial code transmitted as a series of tonal shifts. The series or pulses representing the dial code are applied to first and second timers and to a counter. The counter is selectively strapped to a decoder capable of decoding up to eight inputs, each of which represents a single decimal digit output from the counter. After each digit is gated through the counter as a function of a decoder output and an output of the first timer, the decoder is stepped to the next digit. If an erroneous digit is applied or the second timer times out, the decoder is recycled to accept the first digit from the counter. When a proper dial code has been decoded, an SCR is gated on and a squelch signal is removed from the receiver, permitting the receiver to respond to incoming messages. In addition, a signalling means such as a lamp and a switching transistor controlling a horn relay are turned on to alert the radio telephone user that an incoming call has been decoded. Once an incoming call has been decoded, the receiver squelch will remain off until the system is recycled by turning the radio telephone off and then on. Means are also provided whereby the decoder may be by-passed and the squelch turned off by activation of a pushed talk button or similar switch on the radio telephone. This feature permits the user to monitor the channel before initiating a call.

DETAILED DESCRIPTION OF THE INVENTION

Figure 1A:
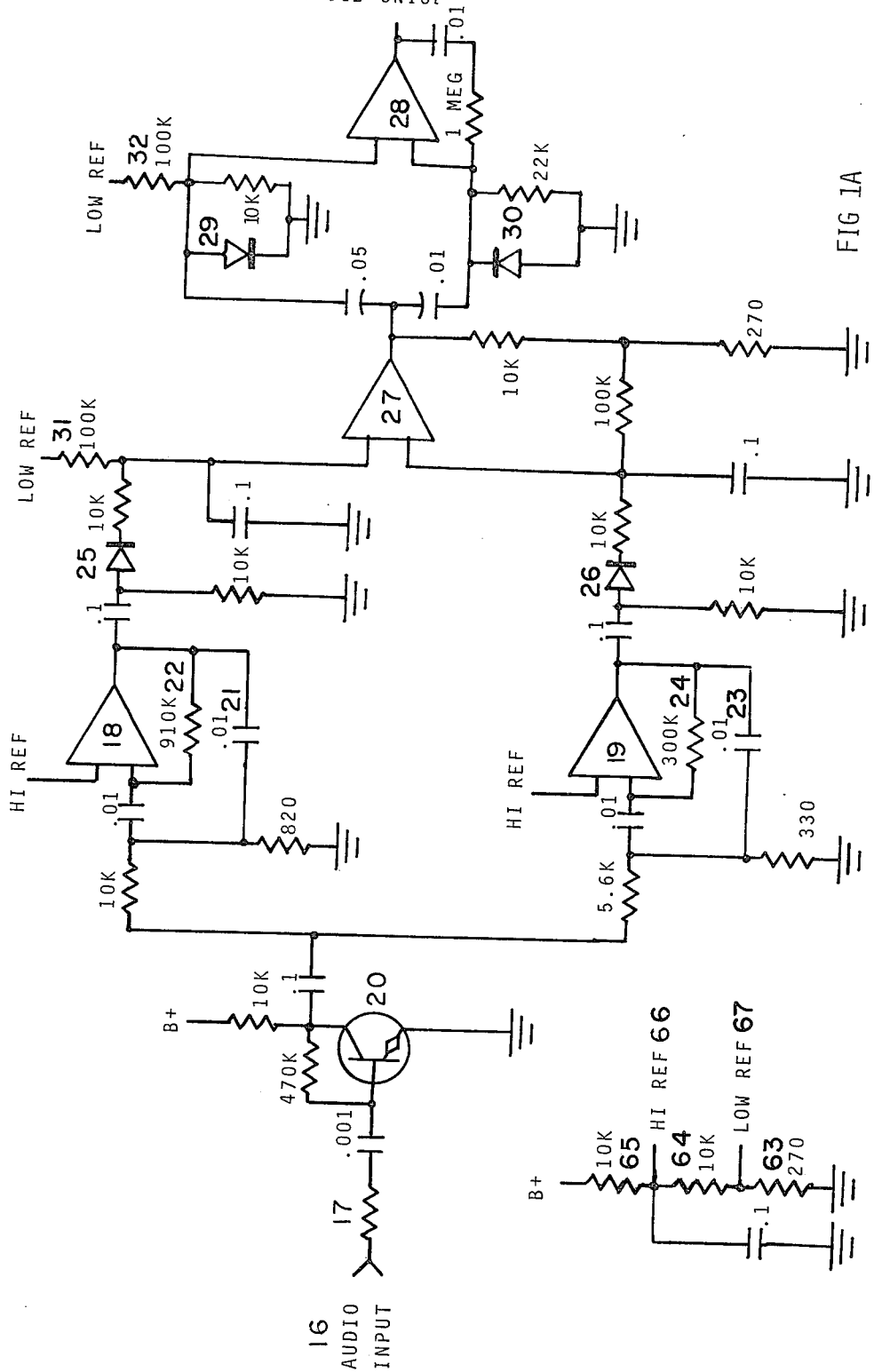
FIG. 1A and 1B form a schematic diagram of the sub-miniature radio telephone decoder.
Figure 1B:
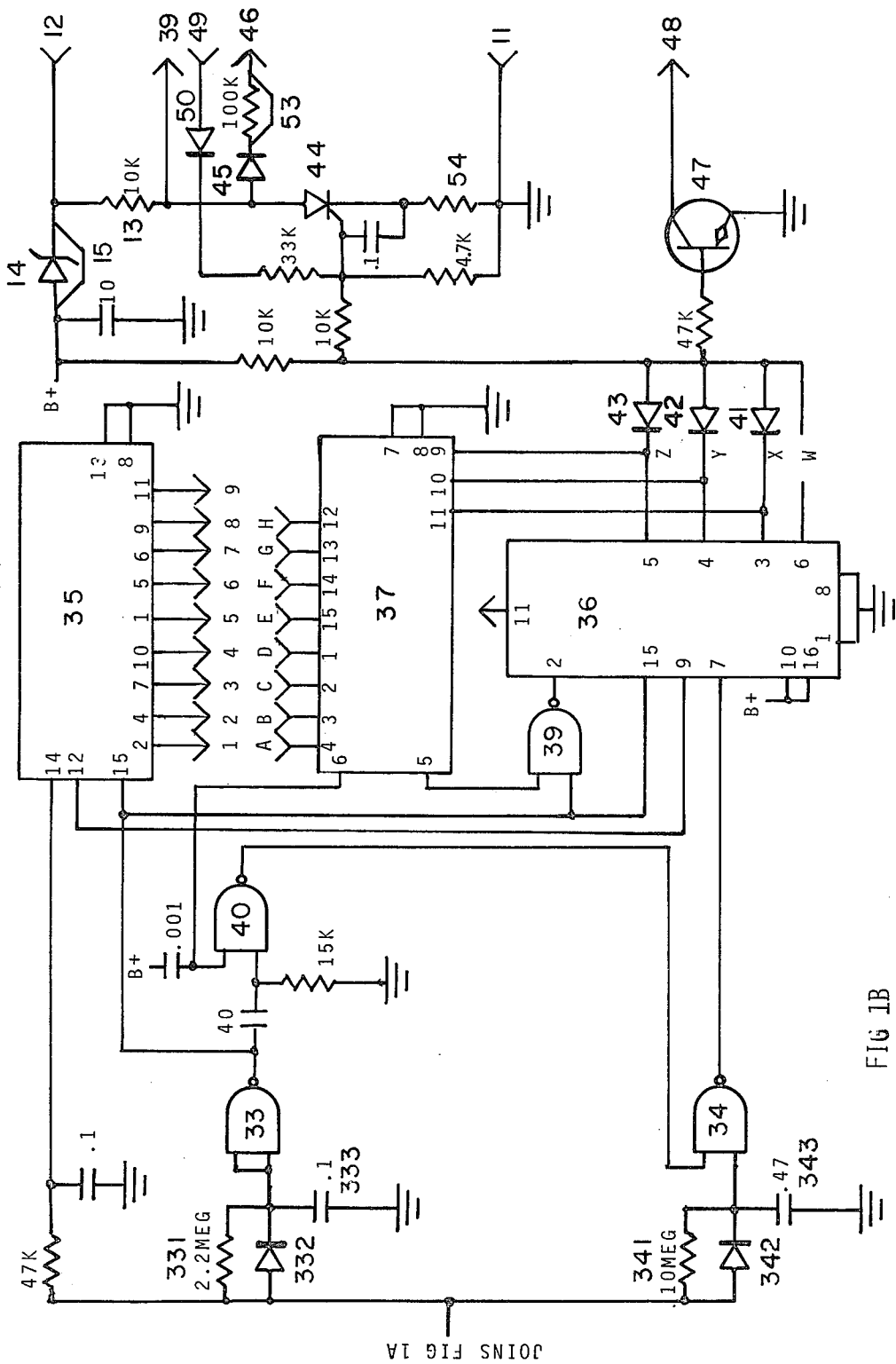

FIGS. 1A and 1B combine to form a schematic diagram representing a preferred embodiment of the sub-miniature radio telephone decoder which may be adapted to be compatible with all existing radio telephone transmitters through bus and audio input matching circuits.

Electrical power for the decoder is obtained from the associated radio telephone by connecting lead 11 to ground and lead 12 to the switched battery voltage. The ground connection for lead 11 can be made at any convenient point on the radio telephone system and the positive lead 12 may be connected to any convenient point in the radio telephone bus circuit. Normally lead 12 is connected to the on-off switch. The positive input on lead 12 is connected to the squelch control circuitry via resistor 13 and adapated to meet the requirements of the primary decoder circuitry via the bus matching circuit comprised of zener diode 14 and bypass strap 15. Zener diode 14 is a five volt zener diode that is normally bypassed by strap 15 unless the radio telephone in which the decoder is installed has a battery voltage in excess of 14 volts.

The audio signals detected by the radio telephone receiver are coupled to the decoder via audio input lead 16 which is connected to a point upstream from the squelch control input. Typical connection points are the volume control high, the discriminator, or the tone coded squelch takeoff points. The decoder is matched to the receiver by resistor 17 which is coupled to the audio takeoff of the radio telephone by input lead 16 of the decoder. The value of resistor 17 is selected to prevent the decoder from being overdriven.

The decoder is matched to the receiver by selecting the value of 17 such that the output of the 600 Hz filter 18 is just starting to clip when the receiver is receiving a 600 Hz signal from an RF signal generator which was set to fully quiet the receiver and then modulate it with a 600 Hz FM input.

With the sub-miniature radio telephone decoder as illustrated in FIG. 1 matched to the radio telephone by zener diode 14 and resistor 17, the audio input signal on lead 16 is coupled to tone filters 18 and 19 by transistor 20. Tone filters 18 and 19 are operational amplifiers such as may be found on the LM124 series integrated circuit which are configured to function as active bandpass filters.

Amplifier 18 includes a feedback network comprised of capacitor 21 and resistor 22 which, in combination with the additional circuit components illustrated cause the operational amplifier to function as a 600 Hz active bandpass filter.

Operational amplifier 19 creates the second tone filter. It is similar to the filter created by amplifier 18 but it is tuned via capacitor 23 and resistor 24 so that it will function as a 1500 Hz active bandpass filter.

The output of the 600 Hz active bandpass filter comprised of operational amplifier 18 is applied to diode 25 which, in combination with the RC integrating circuitry associated therewith, functions as a detector. The output of the 1500 Hz active bandpass filter comprised of operational amplifier 19 is applied to diode 26 which, in combination with the RC integrating network associated therewith, functions as a detector. The outputs of the two detectors are applied to individual inputs of operational amplifier 27 which, in a preferred embodiment, is a type LM124 series operational amplifier. This amplifier produces an output which changes state in response to the FM modulation of the input audio signal on lead 16 changing from 600 to 1500 Hz or from 1500 to 600 Hz. The output of operational amplifier 27 is applied to both inputs of operational amplifier 28 which is also a type LM124 series operational amplifier.

The output of operational amplifier 27 is applied to both inputs of operational amplifier 28 through RC networks including clipping diodes 29 and 30 which cause operational amplifier 28 to function as a monostable multivibrator with a duty cycle of 60/40. This duty cycle was selected because it is equal to the make/break ratio of all Bell System dialers. Thus for each transition of operational amplifier 27, caused by a shift between detectors 25 and 26, a pulse will be produced at the output of operational amplifier 28 of the monostable multivibrator.

The operational amplifiers 18 and 19 which form the active bandpass filters, operational amplifier 27 and operational amplifier 28 included in the monostable multivibrator are all type LM124 series operational amplifiers in a preferred embodiment and contained on a common integrated circuit to minimize the physical size of the circuitry. The reference voltages applied to operational amplifier 27 via resistor 31 and to monostable multivibrator operational amplifier 28 via resistor 32 are developed in a voltage divider network connected between B+ and ground. This voltage divider network is comprised of resistors 63, 64, and 65 and it is tapped to provide a high voltage reference for amplifiers 18 and 19 at 66 and a low voltage reference at 67.

The pulse train output from amplifier 28 of the monostable multivibrator is applied to the interdigit timing circuit comprised of NAND Schmidt Trigger 33, resistor 331, diode 332 and capacitor 333 and the code timer comprised of NAND Schmidt Trigger 34, resistor 341, diode 342 and capacitor 343. The pulse train is also applied to input pin 14 of counter 35 which is a type CD4017 decade counter with 10 decoded outputs indicated in the schematic as output pins 2, 4, 7, 10, 1, 5, 6, 9, and 11 which represent digits 1 through 9 respectively. Pin 12 is a carry out of zero function.

Counter 35 is clocked by operational amplifier 28 via the input at pin 14 and steps once for each pulse received therefrom. The carry out output or zero output 12 of counter 35 is applied to synchronous counter 36 which is a type CD4518 dual synchronous counter with one counter, the zero counter, clocked at the pin 9 input and reset by the pin 15 input from the interdigit timer trigger 33 to provide a 0 digit output for decoder 377 at pin 11. Thus the zero function of the decoded input by counter 35 is provided by the pin 11 output of counter 36 when counter 35 detects ten pulses and generates a carry out or ripple signal. Counter 35 is recycled by the output of the interdigit trigger 33 which is connected to input pin 15 of the counter. Thus the digit value decoded is the number of pulses counted during the interval provided by the interdigit timing circuit with the time duration starting with the last pulse of the series representing a single digit.

The outputs 1 through 9 of counter 35 and zero from counter 36 are applied to input pins 1 through 4 and 12 through 15 of decoder 37 which is an eight channel digital multiplexer type MM54C151. The decoder 37 is configured to respond to an input of eight digits as a function of the wiring between its input pins 9, 10, and 11 and the output pins 3, 4, and 5 of the second counter or digit counter of dual synchronous counter 36. The decoder 37 responds to an eight digit input code but the system decoders digits as a function of straps W, X, Y, and Z which are selectively connected between counter 36 and diode 41, 42, and 43 and SCR44 as illustrated in FIG. 1B. In the illustrated arrangement, decoder 37, will decode seven digits at inputs 4, 3, 2, 1, 15, 14, and 13 respectively.

Decoder 37 is stepped from one digit to the next as a function of inputs on pins 9, 10, and 11 from the digit counter of counter 36 which is stepped by the input at pin 2 from NAND Schmidt Trigger 39 which produces a clocking pulse in response to the output of interdigit timer trigger 33 combined with a high on pin 5 of decoder 37 which is indicative of a proper digit being decoded.

If an improper digit is detected by counter 35 and applied to decoder 37, pin 6 of decoder 37 will be high simultaneously with an output of interdigit timer trigger 33 causing NAND Schmidt Trigger 40 to create an output which causes NAND Schmidt Trigger timer 34 to produce an output pulse which is applied to pin 7 of counter 36 which resets the digit counter of counter 36. This causes the decoder to sense the next group of pulses as the first digit of a code and incoming digits will be repeatedly rejected until a complete and properly sequenced code occurs.

Timer 34 also functions as a code time out means whereby if a dial code is not decoded within four seconds of initiation, counter 36 is cleared and the sequence will begin again.

The outputs at pins 3, 4, 5, and 6 of counter 36 are coupled as a function of decoder digit strapping to diodes 41, 42, and 43 and directly to the control electrode of SCR 44. Depending on strapping, pins 3, 4, or 5 will reverse bias the associated diodes 41, 42, or 43 and cause their anode junction to go high and trigger SCR 44 if this strapping has been accomplished. Thus, the strapping between counter 36 and decoder 37 is extended to include diodes 41 through 43 so SCR 44 will be gated on when the number of sequential digits selected by decoder 37 has been clocked through counter 35 and the number of selected digits have the proper decimal value as determined by counter 35 with a sequence as determined by decoder 37.

When SCR 44 conducts, resistor 13 is coupled to ground which back biases diode 45. This removes a squelch potential applied through lead 46 which inhibits the radio telephone receiver. Thus under normal conditions, the radio telephone receiver is inhibited by a squelch potential through diode 45 but when diode 45 becomes back biased as a function of a properly decoded incoming code, the receiver is allowed to pass the detected intelligence through the audio circuits. Once gated on, SCR 44 will remain in the on condition until power is interrupted by turning the radio telephone off and then on again.

In a preferred embodiment, a switching transistor 47 is controlled by the same input which gates on SCR 44. This switching transistor may be used to control current to a horn relay or other alerting means via lead 48. The ground side of resister 13 is also connected to a call light lead 39 which may be connected to a latching light to provide a visual indication that a code has been received and the receiver is enabled.

Lead 49 may be connected to a push-to-talk switch. This connection provides a gating voltage through diode 50 to the gate electrode of SCR 44 so that an operator may enable the receiver by gating on SCR 44 by pressing the push-to-talk switch on his hand set. Pushing the switch causes SCR 44 to function in the same manner as if a proper code had been decoded by the decoder and the receiver will remain enabled until reset by turning the system off and then on.

In summary, the circuit disclosed in FIG. 1 is comprised of active filters 18 and 19 which serve as filters for 600 Hz and 1500 Hz tones. Diodes 25 and 26 along with their associated integraters comprised of the RC networks associated therewith function as tone detector circuits. The outputs of the tone detectors are applied to operational amplifier 27 which functions as a flip-flop. The detectors toggle or cause a change of state in the output of operational amplifier 27, causing it to follow the switching in the 600/1500 Hz signalling tones. The output from operational amplifier 27 is applied to a monostable multivibrator circuit including operational amplifier 28, whose output is a pulse train with a 60/40 duty cycle matching the make/break ratio of all Bell System dialers. Operational amplifiers, 18, 19, 27, and 28 are all on the same integrated circuit in a preferred embodiment to minimize the space required by the circuitry.

The pulse train from operational amplifier 28 is applied to timing circuits comprised of NAND Schmidt Triggers 33 and 34 which are incorporated in an integrated circuit type CD4093 which also includes NAND Schmidt Triggers 39 and 40. This minimizes component requirements and permits a reduction in size of the overall system. The output of operational amplifier 28 is also applied to the clock input of counter 35 and cause outputs to appear as outputs 1 through 9. A 0 output to provide the tenth digit is generated at the pin 11 output of counter 36 which is responsive to the carry out output of counter 35. Counter 36 is a dual binary counter with one counter providing the zero digit and the other digit decoding function input to decoder 37 and to SCR 44.

NAND Schmidt Trigger 33 is an interdigit timer whose output is low during pulsing and high between digits. NAND Schmidt Trigger 34 is a four second timer used to clear binary counter 36 at the end of the dialing sequence. It is also used to clear binary counter 36 anytime NAND Schmidt Trigger 40 generates a clearing pulse due to an incorrect digit being dialed. NAND Schmidt Trigger 40 recognizes an incorrect number whenever pin 6 of decoder 37 is high at the end of a digit code period.

Decoder 37 is an eight input multiplexer which receives a three line binary address from one half of counter 36 as previously described. Any of the eight inputs can be jumpered to any of the nine outputs from decade counter 35 or the single 0 digit output of counter 36. The decoder can be operated with a digit length of one to eight as a function of inputs on its pins 9, 10, and 11.

When a digit is pulsed into counter 35 from operational amplifier 28, it appears as a high on the respective output. For instance, assume that the number 3 has been pulsed into the counter. If 3 is the first digit on the phone number, it will be tied to input pin 4 on decoder 37. When the multiplexer chip or decoder 37 is in the binary 0 state, the high on pin 4 will pass through the output pin 5, producing a high on pin 12 of NAND Schmidt Trigger 39. After the 3 has been pulsed through the interdigit timer NAND Schmidt Trigger 33, it times out and generates a high at pin 13 of NAND Schmidt Trigger 39, causing its output to go low and advancing counter 36 to one step. The system is now ready to decode the next number that is applied from counter 35 to pin 3 on decoder 37. If this next number is correct, it again advances counter 36. This process will continue until the counter reaches the desired digit length. For example, assume that a 7 digit number is being decoded. In this example all three lines, 3, 4, and 5 of counter 36, will go high to indicate a binary 7. The three lines are coupled to diodes 41, 42, and 43 by strapping points X, Y, and Z. This will reverse bias the three diodes and cause their anode junctions to go high which will forward bias the switching transistor 47 and allow it to activate an accessory relay. This action will also trigger SCR 44 and cause the squelch to be removed from the receiver. The triggering voltage will last about four seconds, until timer 34 resets counter 36. Thus the tone will be heard through the receiver for a four second period to function as an additional means whereby the operator may be made aware that a properly coded signal has been detected.

As previously stated, SCR 44 can also be triggered by applying a voltage to input lead 49. Normally this is accomplished by connecting lead 49 to the receiver transmitter push-to-talk circuit. This allows the user to monitor the channel prior to making a phone call by simply clicking the push-to-talk switch on the radio. To reset the unit the radio must be turned off and back on again. The SCR will reset, forward biasing diode 45 and once again squelching the radio. Squelch of the receiver is normally accomplished by connecting lead 46 to the squelch switch transistor or to the tone coded squelch muting point in the receiver. The positive voltage on lead 46 when SCR 44 is cut off biases the squelch switch transistor which mutes the receiver audio circuits. In some installations, the squelch control of the decoder must be altered to match the receiver squelch. This is acomplished under certain circumstances by lowering the value of resistor R53 and in other circumstances by shorting out resistor R53 and lowering the value of resistor R54 to ensure that adequate current is available to bias the squelch circuits off.

Figure 2:
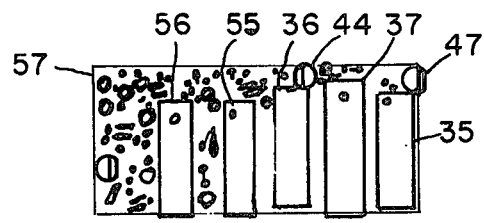
FIG. 2 is a top view of the sub-miniature radio telephone decoder.
Figure 3:
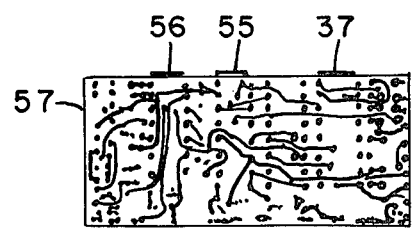
FIG. 3 is a bottom view of the sub-miniature radio telephone decoder.
Figure 4:
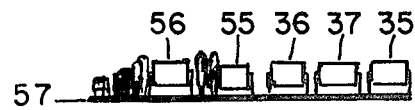
FIG. 4 is a side view of the sub-miniature radio telephone decoder.

The improvements embodied in this invention reside not only in the circuitry explained with respect to FIG. 1 but also with respect to the physical construction of the decoder. This construction is adapted to permit installation of the decoder in all hand-held receivers by virtue of its compact size gained through the novel combination of integrated circuits and components arranged as illustrated in FIGS. 2, 3, and 4. In FIG. 2 note that decoder 35 which is comprised of an integrated circuit type CD4017 is positioned adjacent to decoder 37 which is comprised of an integrated circuit type MM54C151. These two integrated circuits are positioned as close together as possible without subjecting the circuits to the possibility of shorting between pins. This provides for compact size and minimizes the length of jumper wires required to program the decoder. In FIG. 3 the terminals numbered 1 through 9 are on the underside of counter 35 and are connected with the lettered terminals A through H which are on the underside of decoder 37. Note also that the 0 output from counter 36 is positioned close to the decoder program inputs also as a function of the close proximity of counter 36 to decoder 37 which may be more readily observed in FIG. 2.

Integrated circuit 55 is a type CD4093 type quad two-input NAND Schmidt Trigger which contains the Schmidt Triggers 33, 34, 39, and 40 of FIG. 1. This integrated circuit is positioned immediately adjacent to counter 36 to minimize the coder dimensions and the length of interconnections between the various timers controlling the counters and decoders.

Integrated circuit 56 is a type LM124 and contains the operational amplifiers 18, 19, 27, and 28 which form the tone detectors and pulse forming networks. Note that this integrated circuit is positioned between transistor 20 and integrated circuit 55 so that the wiring and interconnections on printed circuit board 57 may be minimized. This minimal amount of required interconnection may best be seen on the underside of printed circuit board 57 as illustrated in FIG. 3.

In FIG. 4, the side view of the printed circuit board assembly 57, note that the resistors and capacitors are positioned perpendicular to the printed circuit board instead of parallel. This permits a closer packing of the components as can be seen in FIG. 2 and results in a decoder assembly which is 25 millimeters wide by 55 millimeters long and 7 millimeters thick, plus or minus 10%.

STATEMENT OF INDUSTRIAL APPLICATION

In view of the preceding specification and drawings, it is apparent that the sub-miniature radio telephone decoder disclosed herein offers a simple and reliable decoder circuit compatible with all known radio telephones and the decoder is assembled so that it may be incorporated within the hand set of radio telephones, thus minimizing the need for additional component mounting and inter-module cabling.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A radio telephone tone decoder, comprising:
    a first active filter means responsive to an audio input for passing a tone signal of a first frequency;
    a second active filter means responsive to an audio input for passing a tone signal of a second frequency;
    a first detector means for rectifying the output of said first active filter;
    a second detector means for rectifying the output of said second active filter;
    a first operational amplifier means responsive to outputs from said first and second detectors for producing a first and second voltage level output indicative of which of said first and second detectors is providing the input to said first operational amplifier;
    a second operational amplifier means driven by the output of said first operational amplifier for producing a voltage pulse each time its input transitions between said first and second voltage levels;
    a first counter means incremented by output pulses from said second operational amplifier;
    an interdigit timer means responsive to said output pulses of said second operational amplifier for resetting said first counter at single digit determining intervals;
    a second counter means incremented by output pulses from said first counter; a decoder responsive to the count in said first and second counters;
    a time out timer means responsive to output pulses from said second operational amplifier and said decoder for clearing said second counter when a proper code has not been decoded within a predetermined time; and
    a third counter means incremented by pulses from said interdigit timer and decoder for stepping said decoder through a series of digits.

2. A radio telephone decoder as defined in claim 1, comprising:
    a switching transistor responsive to an output of said third counter and decoder for completing an electrical circuit.

3. A radio telephone decoder as defined in claim 1, comprising:
    a squelch control means responsive to an output of said third counter and decoder for providing a radio telephone control function.

4. A radio telephone decoder as defined in claim 3, comprising an RC network coupling the output of said first operational amplifier to the input of said second operational amplifier.

5. A radio telephone decoder as defined in claim 3 wherein said squelch control means comprises:
a voltage divider network;
an SCR in said voltage divider network;
a squelch control output for providing said radio telephone control function;
a rectifier connecting said squelch control output to said voltage divider network; and
means for coupling an output of said third counter and decoder representing a predetermined count therein to said SCR for gating on said SCR.

6. A radio telephone decoder as defined in claim 5, comprising:
a rectifier means for coupling a control signal to said SCR.

7. A radio telephone decoder as defined in claim 1, further comprising:
a third operational amplifier incorporated in said first active filter;
a fourth operational amplifier incorporated in said second active filter; and
said first, second, third and fourth operational amplifiers are integrated circuits on a common chip.

8. A radio telephone decoder as defined in claim 7, further comprising
a first NAND Schmidt Trigger incorporated in said first timer;
a second NAND Schmidt Trigger incorporated in said second timer;
a third NAND Schmidt Trigger connecting said interdigit timer, said first counter and said decoder to said third counter;
a fourth NAND Schmidt Trigger connecting said first timer and said decoder to said time out timer; and
said first, second, third, and fourth NAND Schmidt Triggers all are integrated circuits on a common chip.

9. A radio telephone decoder as defined in claim 8, wherein said second and third counters are integrated circuits incorporated on a common chip.

10. A radio telephone decoder, as defined in claim 9, wherein said first counter is an integrated circuit decade counter including ten decoded outputs.

11. A radio telephone decoder as defined in claim 10, wherein said decoder is an eight channel digital multiplexer.

12. A radio telephone tone decoder, comprising:
a first integrated circuit including, a first active filter means responsive to an audio input for passing a tone signal of a first frequency, a second active filter means responsive to an audio input for passing a tone signal of a second frequency, a first detector means for rectifying the output of said first active filter, a second detector means for rectifying the output of said second active filter, a first operational amplifier means responsive to outputs from said first and second detectors for producing a first and second voltage level output indicative of which of said first and second detectors is providing the input to said first operational amplifier, a second operational amplifier means for producing a voltage pulse each time its input transitions between said first and second voltage levels;
a second integrated circuit responsive to said first integrated circuit, including a first counter means incremented by output pulses from said second operational amplifier;
a third integrated circuit responsive to said first integrated circuit, includng an interdigit timer means responsive to said output pulses of said second operational amplifier for resetting said first counter at single digit determining times and a time out timer means responsive to output pulses from said second operational amplifier and said decoder for clearing said second counter when a proper code has not been decoded within a predetermined time;
a fourth integrated circuit responsive to said first, second and third integrated circuits, including a second counter means incremented by output pulses from said first counter;
a fifth integrated circuit responsive to said third and fourth integrated circuits, including a decoder responsive to the count in said first and second counters; and
said fourth integrated circuit further including a third counter means incremented by pulses from said interdigit timer and decoder for stepping said decoder through a series of digits.

13. A radio telephone decoder as defined in claim 12, comprising:
a squelch control responsive to an output of said third counter and decoder representing a predetermined count therein for providing a radio telephone control function.

14. A radio telephone decoder as defined in claim 12, comprising:
a printed circuit board for supporting and interconnecting said integrated circuits and said squelch control, said printed circuit board having a width less than 25.25 millimeters and a length less than 55.55 millimeters.

15. A radio telephone decoder, as defined in claim 14, wherein said printed circuit board and said integrated circuits and said squelch control network are assembled to form an assembly thinner than 7.7 millimeters.

* * * * *